United States Patent
Ohashi

(10) Patent No.: US 11,722,249 B2
(45) Date of Patent: Aug. 8, 2023

(54) COMMUNICATION DEVICE, NON-TRANSITORY COMPUTER READABLE STORAGE MEDIUM, AND SYSTEM

(71) Applicant: KABUSHIKI KAISHA TOKAI RIKA DENKI SEISAKUSHO, Aichi (JP)

(72) Inventor: Yosuke Ohashi, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 7 days.

(21) Appl. No.: 17/697,391

(22) Filed: Mar. 17, 2022

(65) Prior Publication Data
US 2022/0353014 A1    Nov. 3, 2022

(30) Foreign Application Priority Data

Apr. 30, 2021  (JP) .................................. 2021-077407

(51) Int. Cl.
| | |
|---|---|
| *H04L 1/00* | (2006.01) |
| *H04L 7/00* | (2006.01) |
| *H04L 43/106* | (2022.01) |
| *H04W 64/00* | (2009.01) |

(52) U.S. Cl.
CPC .......... *H04L 1/0061* (2013.01); *H04L 7/0016* (2013.01); *H04L 43/106* (2013.01); *H04W 64/006* (2013.01)

(58) Field of Classification Search
CPC ... H04L 1/0041; H04L 1/0045; H04L 1/0061; H04L 7/0016; H04L 43/106; H04L 43/0823; H04L 43/0847
See application file for complete search history.

(56) References Cited

U.S. PATENT DOCUMENTS

| | | | |
|---|---|---|---|
| 2019/0256047 A1 | 8/2019 | Iwashita et al. | |
| 2020/0278441 A1* | 9/2020 | Dackefjord | ........... G01S 13/765 |
| 2021/0239820 A1* | 8/2021 | Lee | ........................ G01S 13/08 |

FOREIGN PATENT DOCUMENTS

JP      2020-118030      8/2020

* cited by examiner

*Primary Examiner* — Shelly A Chase
(74) *Attorney, Agent, or Firm* — Greenblum & Bernstein P.L.C.

(57) ABSTRACT

There is provided a communication device comprising: a communication control section configured to calculate a distance measurement value based on time stamp information received from another communication device during distance measurement that is based on wireless communication that is performed between the communication device and the another communication device different from the communication device, and conforms to specified communication standards, wherein, when the time stamp information is an eigenvalue specified in advance, the communication control section does not calculate the distance measurement value.

9 Claims, 4 Drawing Sheets

COMMUNICATION DEVICE, NON-TRANSITORY COMPUTER READABLE STORAGE MEDIUM, AND SYSTEM

CROSS REFERENCE TO RELATED APPLICATION(S)

This application is based upon and claims benefit of priority from Japanese Patent Application No. 2021-077407, filed on Apr. 30, 2021, the entire contents of which are incorporated herein by reference.

BACKGROUND

The present invention relates to a communication device, a non-transitory computer readable storage medium, and a system.

In recent years, a technology that performs a process based on wireless signals transmitted and received between devices has been developed. For example, JP 2020-118030A discloses a technology that estimates (distance measurement) a distance between devices by using an Ultra Wide Band (UWB) signal.

SUMMARY

According to distance measurement between devices, a distance measurement value that is an estimated value of a distance between the devices is calculated based on time stamp information that indicates a transmission/reception time difference between a plurality of transmitted and received wireless signals. However, when a device that generates the time stamp information cannot receive the wireless signal, there is a case where the time stamp information is not normally generated, and the distance measurement value cannot be normally calculated.

Therefore, the present invention has been made in light of the above problem, and an object of the present invention is to secure accuracy of a distance measurement value that is calculated by distance measurement between devices.

To solve the above-described problems, according to an aspect of the present invention, there is provided a communication device comprising: a communication control section configured to calculate a distance measurement value based on time stamp information received from another communication device during distance measurement that is based on wireless communication that is performed between the communication device and the another communication device different from the communication device, and conforms to specified communication standards, wherein, when the time stamp information is an eigenvalue specified in advance, the communication control section does not calculate the distance measurement value.

In addition, to solve the above-described problems, according to another aspect of the present invention, there is provided a non-transitory computer readable storage medium having a program stored therein, the program causing: a computer to realize a control function configured to calculate a distance measurement value based on time stamp information received from another communication device during distance measurement that is based on wireless communication that is performed with another communication device, and conforms to specified communication standards; and the control function to not calculate the distance measurement value when the time stamp information is an eigenvalue specified in advance.

In addition, to solve the above-described problems, according to another aspect of the present invention, there is provided a system comprising: a first communication device; and a second communication device different from the first communication device, wherein the first communication device includes a communication control section configured to calculate a distance measurement value based on time stamp information received from the second communication device during distance measurement that is based on wireless communication that is performed between the first communication device and the second communication device, and conforms to specified communication standards, when the time stamp information is an eigenvalue specified in advance, the communication control section does not calculate the distance measurement value.

As described above, according to the present invention, it is possible to secure accuracy of a distance measurement value that is calculated by distance measurement between devices.

DETAILED DESCRIPTION OF THE EMBODIMENT

Figure 1:
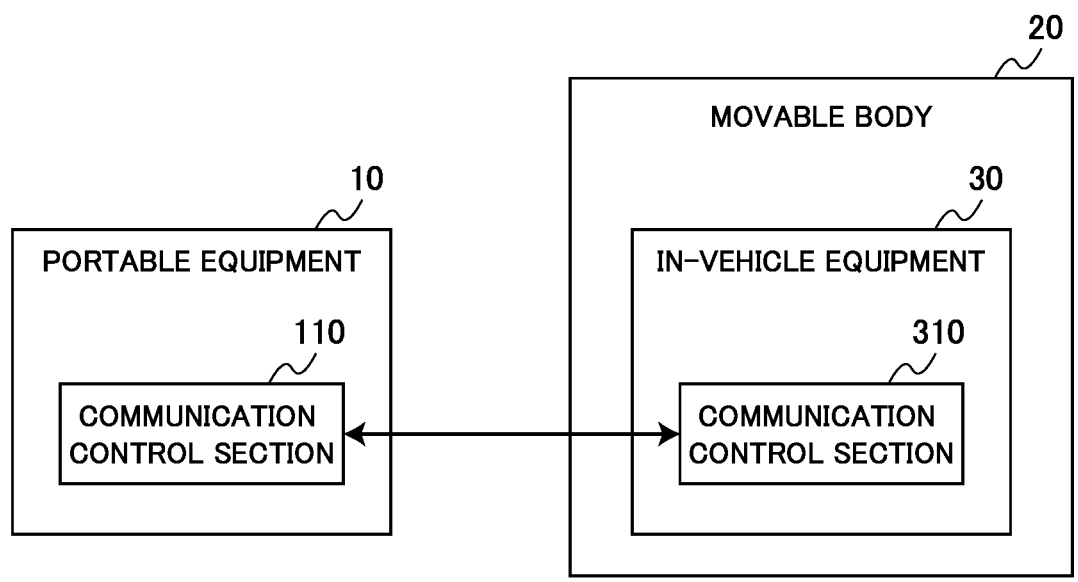
FIG. 1 is a block diagram illustrating a configuration example of a system 1 according to an embodiment of the present invention.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

1. Embodiment

<<1.1. System Configuration Example>>

First, a configuration example of a system 1 according to the embodiment of the present invention will be described. FIG. 1 is a block diagram illustrating the configuration example of the system 1 according to the embodiment of the present invention.

As illustrated in FIG. 1, the system 1 according to the present embodiment includes portable equipment 10 and in-vehicle equipment 30 that is mounted on a movable body 20.

(Portable Equipment 10)

The portable equipment 10 according to the present embodiment is an example of a communication device that is carried by a user who uses the movable body 20 (e.g., an owner of the movable body 20 or a person who is permitted by the owner to use the movable body 20).

As illustrated in FIG. 1, the portable equipment 10 according to the present embodiment includes a communication control section 110.

(Communication Control Section 110)

The communication control section 110 according to the present embodiment controls distance measurement that is based on wireless communication that is performed with the in-vehicle equipment 30 mounted on the movable body 20, and conforms to specified communication standards.

In this regard, the distance measurement according to the present embodiment refers to a process of estimating a distance between the communication control section 110 and a communication control section 310 included in the in-vehicle equipment 30.

For example, the communication control section 110 according to the present embodiment transmits and receives a plurality of wireless signals that conform to the specified communication standards used for distance measurement to and from the communication control section 310.

Hence, the communication control section 110 according to the present embodiment includes an antenna that transmits and receives wireless signals that conform to the specified communication standards.

An example of the specified communication standards according to the present embodiment is ultra wide band communication.

On the other hand, the specified communication standards according to the present embodiment are not limited to the above example. The specified communication standards according to the present embodiment may adopt arbitrary communication standards that can realize distance measurement.

Furthermore, the communication control section 110 according to the present embodiment executes one of generation of time stamp information that indicates a transmission/reception time difference between a plurality of wireless signals, and calculation of a distance measurement value that is based on the time stamp information.

For example, the communication control section 110 according to the present embodiment may generate the time stamp information, and transmit the time stamp information to the communication control section 310 that calculates the distance measurement value.

On the other hand, the communication control section 110 according to the present embodiment can also calculate the distance measurement value based on the time stamp information received from the communication control section 310.

Functions of the communication control section 110 according to the present embodiment may be designed according to a specification and an operation.

Note that the functions of the communication control section 110 according to the present embodiment are realized by various processors.

(In-Vehicle Equipment 30)

The in-vehicle equipment 30 according to the present embodiment is an example of a communication device that is mounted on the movable body 20.

Note that the movable body 20 according to the present embodiment may be various devices such as vehicles, ships, and airplanes that can move.

At least one or more pieces of the in-vehicle equipment 30 according to the present embodiment are mounted on the one movable body 20.

As illustrated in FIG. 1, the in-vehicle equipment 30 according to the present embodiment includes the communication control section 310.

(Communication Control Section 310)

The communication control section 310 according to the present embodiment controls distance measurement that is performed with the communication control section 110 included in the portable equipment 10, and conforms to the specified communication standards.

For example, the communication control section 310 according to the present embodiment transmits and receives a plurality of wireless signals that conform to the specified communication standards used for distance measurement to and from the communication control section 110.

Hence, the communication control section 310 according to the present embodiment includes an antenna that transmits and receives wireless signals that conform to the specified communication standards.

Furthermore, the communication control section 310 according to the present embodiment executes one of generation of time stamp information that indicates a transmission/reception time difference between a plurality of wireless signals, and calculation of a distance measurement value that is based on the time stamp information.

For example, the communication control section 310 according to the present embodiment may calculate the distance measurement value based on the time stamp information received from the communication control section 110.

On the other hand, the communication control section 310 according to the present embodiment may generate the time stamp information, and transmit the time stamp information to the communication control section 110 that calculates the distance measurement value.

Functions of the communication control section 310 according to the present embodiment may be designed according to a specification and an operation.

Note that the functions of the communication control section 310 according to the present embodiment are realized by various processors.

The configuration example of the system 1 according to the present embodiment has been described above. Note that the above configuration described with reference to FIG. 1 is a mere example, and the configuration of the system 1 according to the present embodiment is not limited to this example.

For example, the portable equipment 10 and the in-vehicle equipment 30 have been described as the example of communication devices that execute distance measurement with reference to FIG. 1. However, a technological idea of the present invention is not limited to distance measurement related to a movable body.

The technological idea of the present invention is widely applicable to various communication devices that execute distance measurement.

<<1.2. Details of Control>>

Next, various types of control executed by the system 1 according to the present embodiment will be described in detail.

As described above, the portable equipment 10 and the in-vehicle equipment 30 according to the present embodiment transmit and receive wireless signals that conform to the specified communication standards, and execute distance measurement based on the wireless signals.

First, a flow of the distance measurement executed between the portable equipment 10 and the in-vehicle equipment 30 will be described citing an example.

Figure 2:
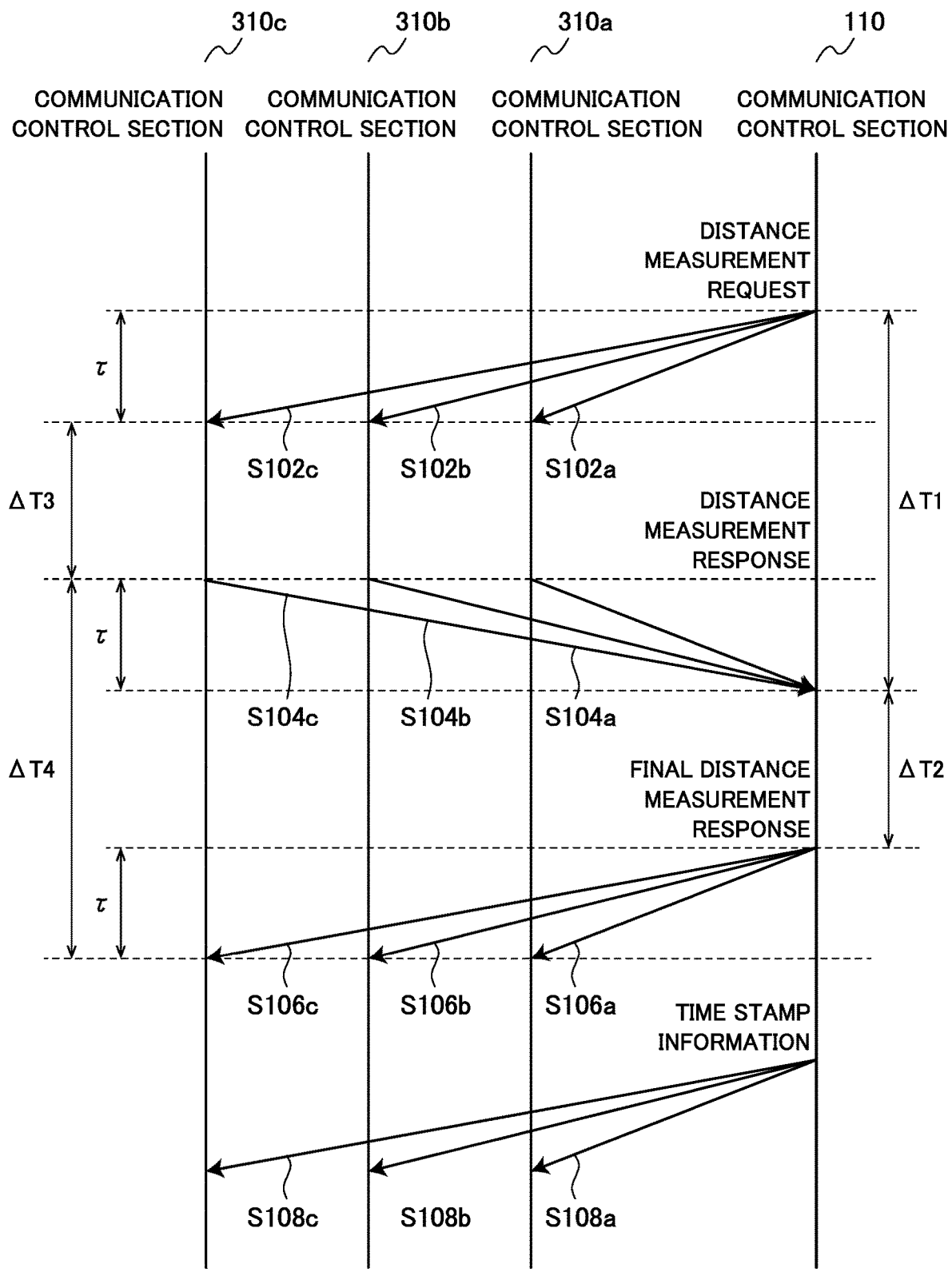
FIG. 2 is a sequence diagram illustrating an example of a flow of transmission/reception of wireless signals during distance measurement according to the embodiment.

FIG. 2 is a sequence diagram illustrating an example of a flow of transmission/reception of wireless signals during distance measurement according to the present embodiment.

Note that FIG. 2 exemplifies the flow in a case where three pieces of in-vehicle equipment 30a to 30c are mounted on the movable body 20.

Furthermore, FIG. 2 exemplifies a flow in a case where the communication control section 110 included in the portable equipment 10 generates the above-described time stamp information, and communication control sections 310a to 310c included in the pieces of in-vehicle equipment 30a to 30c each calculate a distance measurement value based on the time stamp information.

In the case of the example illustrated in FIG. 2, the communication control section 110 included in the portable equipment 10 first transmits a distance measurement request (S102a to S102c).

Next, each of the communication control sections 310a to 310c that have received the distance measurement requests in steps S102a to 102c transmits a distance measurement response as a response to the distance measurement request (S104a to S104c).

The communication control section 110 that has received the distance measurement responses in steps S104a to 104c transmits a final distance measurement response as a response to the distance measurement response (S106a to S106c).

Next, the communication control section 110 calculates a difference $\Delta T1$ between a transmission time of the distance measurement request and a reception time of the distance measurement response, and a difference $\Delta T2$ between a reception time of a response signal and a transmission time of the final distance measurement response, and transmits pieces of time stamp information including $\Delta T1$ and $\Delta T2$ (S108a to S108c).

Note that, in the case illustrated in FIG. 2, the communication control section 110 may generate the time stamp information for each of the communication control sections 310a to 310c, and collectively transmit the three pieces of time stamp information.

Each of the communication control sections 310a to 310c that have received the pieces of time stamp information in steps S108a to S108c calculates a distance measurement value based on the time stamp information.

In this case, each of the communication control sections 310a to 310c first calculates a difference $\Delta T3$ between a reception time of the distance measurement request and a transmission time of the distance measurement response, and a difference $\Delta T4$ between a transmission time of a response signal and a reception time of a final distance measurement response.

Next, each of the communication control sections 310a to 310c calculates a propagation time t that is common between the distance measurement request, the distance measurement response, and the final distance measurement response by using $\Delta T1$ and $\Delta T2$ included in the received time stamp information, and calculated $\Delta T3$ and $\Delta T4$.

Each of the communication control sections 310a to 310c may calculate the propagation time t by using following equation (1).

$$T=(T1 \times T4 - T2 \times T3)/(T1+T2+T3+T4) \quad \text{(Equation 1)}$$

By multiplying the calculated propagation time t with a known signal speed, each of the communication control sections 310a to 310c calculates a distance measurement value that is an estimated value of a distance to the communication control section 110.

As described above, one of the communication control section 110 and the communication control section 310 according to the present embodiment can calculate the distance measurement value based on the time stamp information received from the other one of the communication control section 110 and the communication control section 310.

However, it is also likely that the time stamp information is not normally generated depending on a communication situation.

For example, a case is assumed where the communication control section 110 cannot receive the distance measurement response transmitted by the communication control section 310b in step S104b illustrated in FIG. 2.

In this case, a situation that $\Delta T1$ and $\Delta T2$ related to the communication control section 310b are not normally calculated and wrong time stamp information is transmitted may be also likely to occur (for example, the time stamp information including previously held $\Delta T1$ and $\Delta T2$ is transmitted).

When the above situation occurs, the communication control section 310b calculates a distance measurement value of low reliability based on the wrong time stamp information.

The technological idea of the present invention has been conceived focusing on the above point, and makes it possible to secure accuracy of a distance measurement value that is calculated by distance measurement.

Hence, one of features of the communication control section that controls transmission of time stamp information used to calculate a distance measurement value among the communication control section 110 and the communication control section 310 according to the present embodiment is that, when the communication control section cannot receive a distance measurement response that is a response to a transmitted distance measurement request within a specified time, the communication control section sets an eigenvalue to the time stamp information, and transmits the time stamp information.

On the other hand, one of features of the communication control section that calculates the distance measurement value based on the received time stamp information among the communication control section 110 and the communication control section 310 according to the present embodiment is that, when the received time stamp information is the eigenvalue specified in advance, the communication control section does not calculate the distance measurement value.

According to the above control, it is possible to effectively avoid generation of wrong time stamp information, and calculation of a distance measurement value of low reliability that is based on the time stamp information.

Note that the above eigenvalue specified in advance may be a bit sequence that can be decided as inappropriate as a time stamp that indicates a difference between two times.

For example, the eigenvalue specified in advance may be a bit sequence whose all bits are 0. This is because $\Delta T1$ and $\Delta T2$ never take 0 during distance measurement accompanied by the sequence illustrated in FIG. 2.

Furthermore, for example, the eigenvalue specified in advance may be a bit sequence whose all bits are 1. This is because it is supposed that, when $\Delta T1$ and $\Delta T2$ take maximum values during distance measurement, a distance exceeds a distance between devices that can be measured.

Flows of transmission control of a time stamp according to the present embodiment and execution control of distance measurement that is based on a time stamp will be described in detail below citing an example.

Note that a case will be exemplified below where the communication control section 110 included in the portable equipment 10 transmits the time stamp information, and controls execution of distance measurement that is based on the time stamp received by the communication control section 310 included in the in-vehicle equipment 30.

Figure 3:
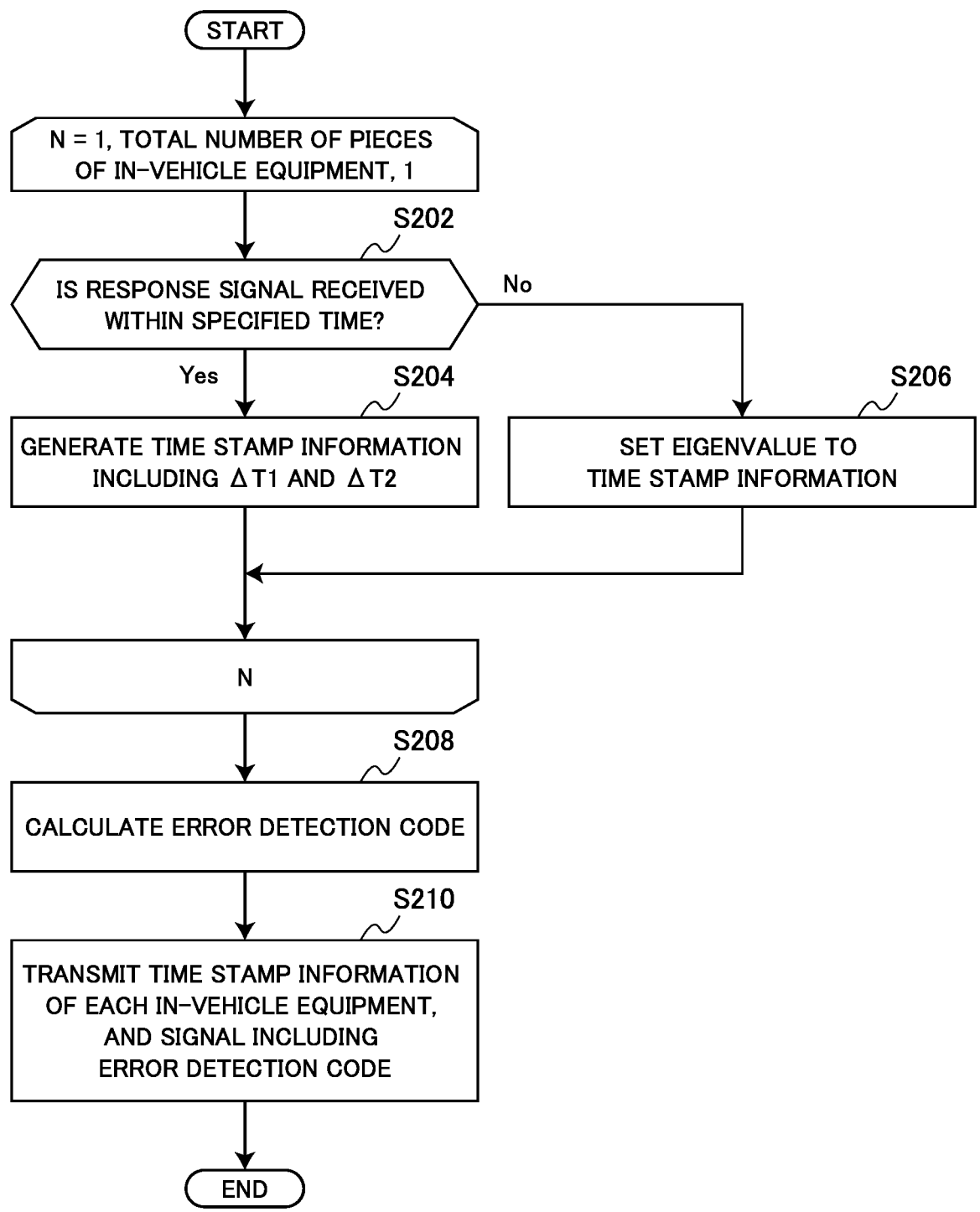
FIG. 3 is a flowchart illustrating a flow of transmission control of a time stamp according to the embodiment.

FIG. 3 is a flowchart illustrating the flow of transmission control of a time stamp according to the present embodiment.

In a case of an example illustrated in FIG. 3, the communication control section 110 included in the portable equipment 10 sets an initial value of a variable N to 1, a final value to a total number of pieces of the in-vehicle equipment 30, and an incremental value to 1, and repeatedly executes the process in step S202 and the process in step S204 or step S206 described below.

The communication control section 110 first decides whether or not the communication control section 110 has received a distance measurement response from the in-vehicle equipment 30 that is a decision target within a specified time after transmitting a distance measurement request (S202).

In a case where the communication control section 110 decides that the communication control section 110 has received the distance measurement response from the in-vehicle equipment 30 that is the decision target within the specified time (S202: Yes), the communication control section 110 calculates ΔT1 and ΔT2, and generates time stamp information including ΔT1 and ΔT2 (S204).

On the other hand, in a case where the communication control section 110 decides that the communication control section 110 has not received the distance measurement response from the in-vehicle equipment 30 that is the decision target within the specified time (S202: No), the communication control section 110 sets an eigenvalue specified in advance to the time stamp information (S206).

When finishing the process in step S202 and the process in step S204 or step S206 for all pieces of in-vehicle equipment 30, the communication control section 110 calculates an error detection code next (S208).

The error detection code may be, for example, a checksum or a Cyclic Redundancy Check (CRC).

In this regard, the above example is a mere example, and an arbitrary method that can detect an error of a bit sequence may be adopted for the error detection code according to the present embodiment.

Next, the communication control section 110 transmits the time stamp information of each in-vehicle equipment 30 and the signal including the error detection code (S210).

Consequently, by assigning the error detection code to the time stamp information and transmitting the time stamp information, the communication control section 310 included in the in-vehicle equipment 30 can detect an error related to data garbling even when the data garbling occurs in the time stamp information.

Note that the signal transmitted by the communication control section 110 in step S210 may be common between the plurality of pieces of in-vehicle equipment 30.

In a case where, for example, the three pieces of in-vehicle equipment 30a to 30c are mounted on the movable body 20, and the communication control section 110 can receive the distance measurement responses from all pieces of in-vehicle equipment 30a to 30c, the signal transmitted by the communication control section 110 in step S210 may include following pieces of information.

Time stamp information for in-vehicle equipment 30a (ΔT1 and ΔT2)
Time stamp information for in-vehicle equipment 30b (ΔT1 and ΔT2)
Time stamp information for in-vehicle equipment 30c (ΔT1 and ΔT2)
Error detection code Furthermore, in a case where, for example, the communication control section 110 cannot receive the distance measurement response from the in-vehicle equipment 30b of the pieces of in-vehicle equipment 30a to 30c, the signal transmitted by the communication control section 110 in step S210 may include following pieces of information.

Time stamp information for in-vehicle equipment 30a (ΔT1 and ΔT2)
Time stamp information for in-vehicle equipment 30b (eigenvalue)
Time stamp information for in-vehicle equipment 30c (ΔT1 and ΔT2)
Error detection code On the other hand, the communication control section 110 can also generate the time stamp information and the error detection code associated with each of the pieces of in-vehicle equipment 30a to 30c, and transmit the time stamp information and the error detection code to each of the pieces of in-vehicle equipment 30a to 30c.

Hereinafter, the flow of execution control of distance measurement based on time stamp information according to the present embodiment will be described citing an example.

Figure 4:
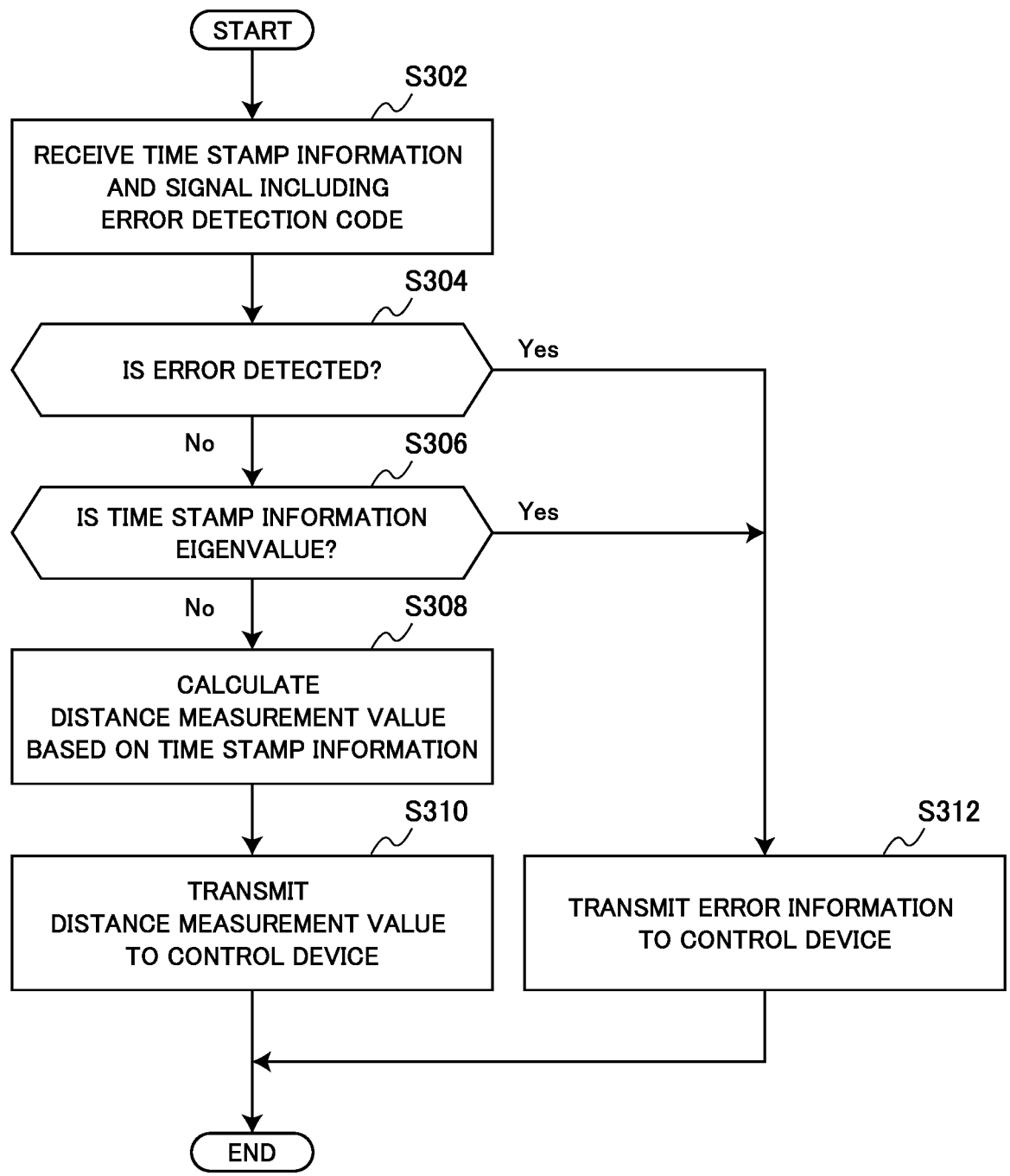
FIG. 4 is a flowchart illustrating a flow of execution control of distance measurement that is based on time stamp information according to the embodiment.

FIG. 4 is a flowchart illustrating the flow of the execution control of the distance measurement that is based on the time stamp information according to the present embodiment.

In a case of an example illustrated in FIG. 4, the communication control section 310 included in the in-vehicle equipment 30 first receives the time stamp information and the signal including the error detection code (S302).

Next, the communication control section 310 inspects the time stamp information based on the error detection code included in the signal received in step S302.

In a case where the communication control section 310 detects the error in the time stamp information (S304: Yes), the communication control section 310 does not calculate the distance measurement value, and transmits error information that indicates that the error has been detected to a control device that is mounted on the movable body 20 (S312).

On the other hand, in a case where the communication control section 310 does not detect the error in the time stamp information (S304: No), the communication control section 310 subsequently decides whether or not the time stamp information is the eigenvalue specified in advance (S312).

In a case where the communication control section 310 decides that the time stamp information is the eigenvalue specified in advance (S306: Yes), the communication control section 310 does not calculate the distance measurement value, and transmits error information that indicates that the eigenvalue has been received as the time stamp information to the control device that is mounted on the movable body 20 (S312).

On the other hand, in a case where the communication control section 310 decides that the time stamp information is not the eigenvalue specified in advance (S306: No), the communication control section 310 calculates a distance measurement value based on the time stamp information (S308).

Next, the communication control section 310 transmits the distance measurement value calculated in step S308 to the control device that is mounted on the movable body 20 (S310).

The control device that is mounted on the movable body 20 executes control related to, for example, unlocking of a door included in the movable body 20 and starting of an engine based on the distance measurement value received from the communication control section 310.

2. Supplementary Explanation

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

Furthermore, a series of processes of each device described in this description may be realized by programs stored in a non-transitory computer readable storage medium. Each program is read on an RAM when, for example, executed by a computer, and is executed by a processor such as a CPU. The above storage medium is, for example, a magnetic disk, an optical disk, a magneto-optical disk, or a flash memory. Furthermore, the above programs may be distributed via, for example, a network without using the storage medium.

What is claimed is:

1. A communication device comprising:
   a communication control section configured to calculate a distance measurement value based on time stamp information received from another communication device during distance measurement that is based on wireless communication that is performed between the communication device and the another communication device different from the communication device, and conforms to specified communication standards,
   wherein, when the time stamp information is an eigenvalue specified in advance, the communication control section does not calculate the distance measurement value.

2. The communication device according to claim 1,
   wherein the eigenvalue specified in advance is a bit sequence that can be decided as invalid as a time stamp that indicates a difference between two times.

3. The communication device according to claim 2,
   wherein the communication control section inspects the time stamp information based on an error detection code that accompanies the time stamp information, and does not calculate the distance measurement value when detecting an error in the time stamp information.

4. The communication device according to claim 3,
   wherein the error detection code is a checksum or a Cyclic Redundancy Check (CRC).

5. The communication device according to claim 1,
   wherein, when not calculating the distance measurement value, the communication control section transmits information related to a detected error to a control device.

6. The communication device according to claim 1,
   wherein the specified communication standards include ultra wide band wireless communication.

7. The communication device according to claim 1, wherein
   the communication device is mounted on a movable body, and
   the another communication device is carried by a user who uses the movable body.

8. A non-transitory computer readable storage medium having a program stored therein, the program causing:
   a computer to realize a control function configured to calculate a distance measurement value based on time stamp information received from another communication device during distance measurement that is based on wireless communication that is performed with another communication device, and conforms to specified communication standards; and
   the control function to not calculate the distance measurement value when the time stamp information is an eigenvalue specified in advance.

9. A system comprising:
   a first communication device; and
   a second communication device different from the first communication device, wherein
   the first communication device includes a communication control section configured to calculate a distance measurement value based on time stamp information received from the second communication device during distance measurement that is based on wireless communication that is performed between the first communication device and the second communication device, and conforms to specified communication standards,
   when the time stamp information is an eigenvalue specified in advance, the communication control section does not calculate the distance measurement value.

* * * * *